United States Patent [19]

Iida

[11] Patent Number: 5,086,626
[45] Date of Patent: Feb. 11, 1992

[54] AIR CONDITIONER WITH FUNCTION FOR TEMPERATURE CONTROL OF RADIANT HEAT EXCHANGER

[75] Inventor: Tadasato Iida, Fuji, Japan

[73] Assignee: Kabushiki Kaisha Toshiba, Kawasaki, Japan

[21] Appl. No.: 288,959

[22] Filed: Dec. 23, 1988

[30] Foreign Application Priority Data

Jan. 13, 1988 [JP] Japan .................................. 63-5104

[51] Int. Cl.⁵ .......................... F25B 13/00; F25B 5/00
[52] U.S. Cl. ....................................... 62/184; 62/160;
62/186; 62/228.4; 62/DIG. 1; 62/324.1;
62/324.6; 237/2 B; 236/38; 165/57
[58] Field of Search .................... 62/184, 324.1, 324.6,
62/160, DIG. 1, 186; 236/38; 237/2 B, 69;
165/56, 57

[56] References Cited

U.S. PATENT DOCUMENTS

| | | | |
|---|---|---|---|
| 4,007,605 | 2/1977 | Denny ................................ | 62/184 |
| 4,697,430 | 10/1987 | Toyoda et al. ...................... | 62/209 |
| 4,939,910 | 7/1990 | Umezu et al. ...................... | 62/228.4 |

FOREIGN PATENT DOCUMENTS

| | | | |
|---|---|---|---|
| 0000803 | 1/1980 | Japan .................................... | 62/160 |
| 0198930 | 12/1982 | Japan .................................... | 237/69 |
| 0088548 | 5/1983 | Japan .................................... | 62/160 |
| 0035736 | 2/1984 | Japan .................................... | 165/57 |
| 62-62261 | 12/1987 | Japan . | |
| 2080979 | 2/1982 | United Kingdom . | |
| 2086617 | 5/1982 | United Kingdom . | |

*Primary Examiner*—John Ford
*Attorney, Agent, or Firm*—Cushman, Darby & Cushman

[57] ABSTRACT

A refrigeration cycle comprising a compressor and an outdoor heat exchanger, both of which are arranged outside a room to be air-conditioned, to communicate with an indoor heat exchanger and a radiant heat exchanger, both of which are arranged inside the room, and are operated simultaneously in a heating operation mode. A fan delivers air to the indoor heat exchanger. A temperature sensor detects the temperature of the radiant heat exchanger. A controller controls the indoor heat exchanger fan speed so as to control the radiant heat temperature from the radiant heat exchanger in accordance with a temperature detection signal from the sensor.

18 Claims, 8 Drawing Sheets

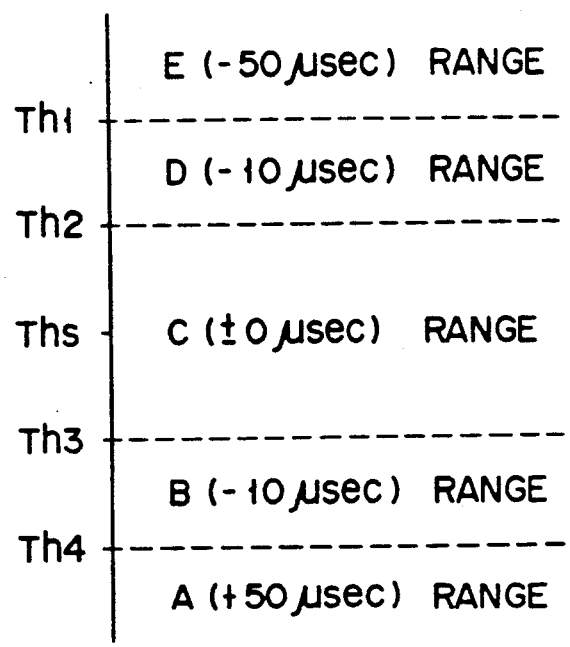
F I G. 4
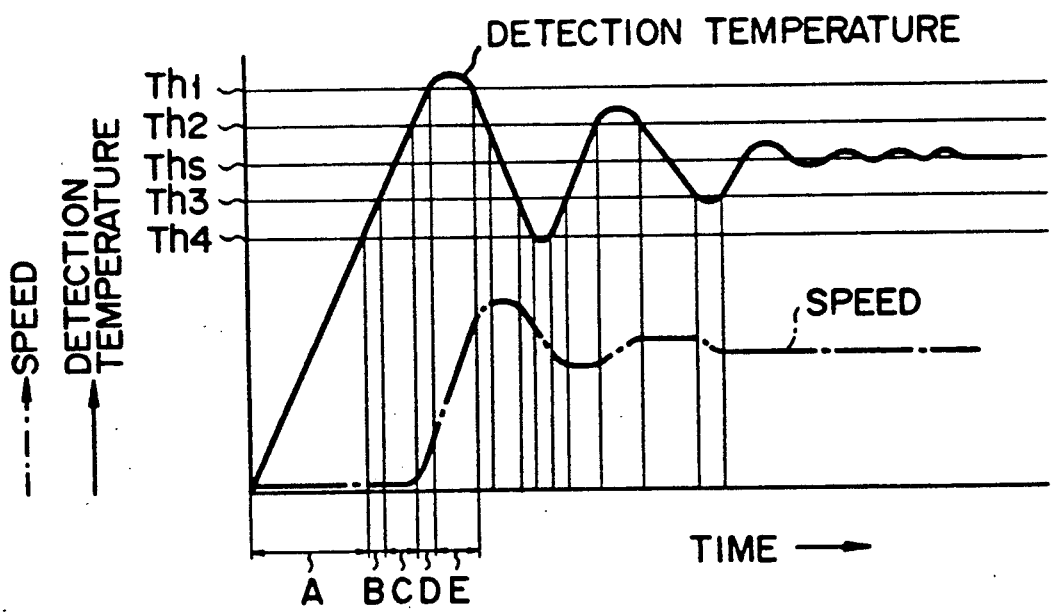
F I G. 5

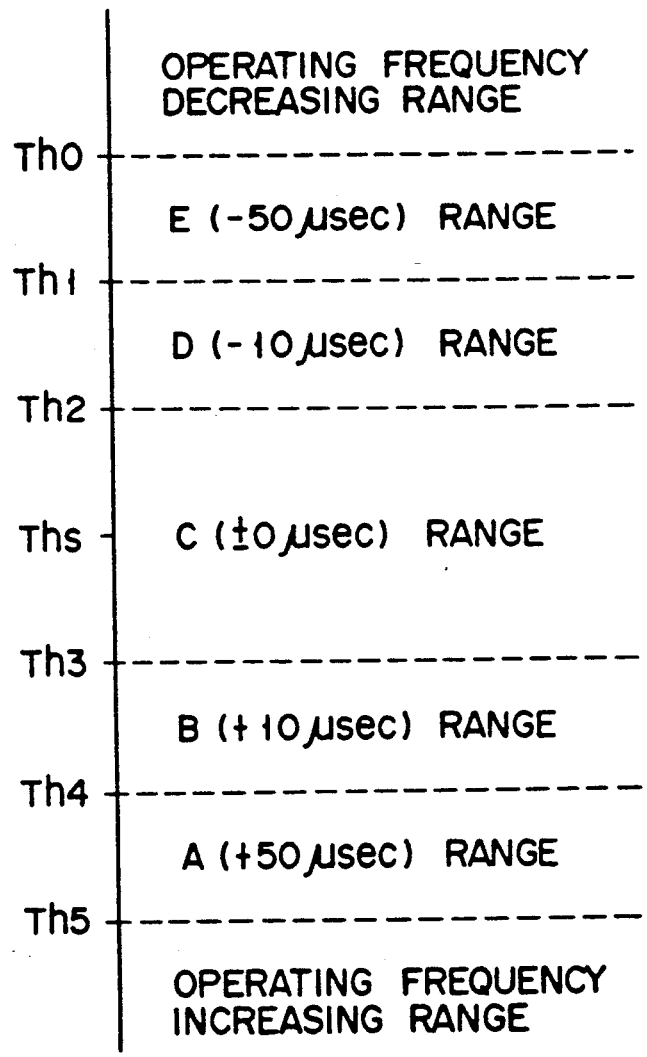
F I G. 8

AIR CONDITIONER WITH FUNCTION FOR TEMPERATURE CONTROL OF RADIANT HEAT EXCHANGER

BACKGROUND OF THE INVENTION

1. Field of the Invention

This invention generally relates to an air conditioner and, more particularly, to an air conditioner with a function for temperature control of a radiant heat exchanger.

2. Description of the Related Art

The air conditioner comprising a heat pump type refrigeration cycle, shown in FIG. 10, and which is capable of performing cooling and heating operations is a known conventional air conditioner.

Referring to FIG. 10, reference numeral 1 denotes a compressor, with which 4-way valve 2, outdoor heat exchanger 3, a decompressor, e.g., expansion valve 4, and indoor heat exchanger 5 sequentially communicate, thereby constituting a heat pump type refrigeration cycle.

In a cooling operation, a refrigerant is supplied in the directions indicated in FIG. 10 by solid arrows, to form a cooling cycle. In this case, outdoor heat exchanger 3 serves as a condenser, whereas indoor heat exchanger 5 serves as an evaporator.

In a heating operation, on the other hand, a refrigerant is supplied in the directions indicated in FIG. 10 by broken arrows, upon the switching of 4-way valve 2 to form a heating cycle. In this case, indoor heat exchanger 5 serves as a condenser, whereas outdoor heat exchanger 3 serves as an evaporator.

Note that outdoor- and indoor-fans 6 and 7 are respectively arranged near outdoor and indoor heat exchangers 3 and 5.

In an air conditioner of this type, warm air is blown into a room during a heating operation. However, if warm air is blown directly on to an occupant of the room, the person may feel some discomfort, i.e. a so-called feeling of draftiness.

In some air conditioners, therefore, a radiant panel (radiant heat exchanger) is arranged on the front surface of an indoor unit so that heat is radiated into a room in addition to being blown in, the purpose of such an arrangement being to decrease any feeling of draftiness by means of the addition of a heating function, such as a hearth function, with radiant heat.

In the case of the above air conditioner, however, the operation of the compressor is controlled simply in accordance with changes in the indoor temperature, with the radiant heat temperature being completely neglected. Since the radiant heat temperature can vary considerably, problems are still left in terms of discomfort to the person.

SUMMARY OF THE INVENTION

It is, therefore, an object of the present invention to provide a new and improved air conditioner having a temperature control function in relation to a radiant heat exchanger, which can suppress variations in the temperature of heat radiated from the radiant heat exchanger so that the heating function using free convection is more consistent, thereby resulting in greater user comfort.

According to the present invention, there is provided an air conditioner comprising:

refrigeration cycle means for causing at least a compressor and an outdoor heat exchanger, both of which are arranged outside a room to be air-conditioned, to communicate with an indoor heat exchanger and a radiant heat exchanger, both of which are arranged inside the room, the refrigeration cycle means being operated in a heating mode;

fan means for supplying air to at least the indoor heat exchanger;

detecting means for detecting the temperature of the radiant heat exchanger; and control means for controlling the fan means so as to control the temperature of heat, radiated from the radiant heat exchanger, through the indoor heat exchanger, in accordance with a temperature detection signal from the detecting means.

BRIEF DESCRIPTION OF THE DRAWINGS

These and other objects and features of the present invention can be understood through the following embodiments with reference to the accompanying drawings, of which:

FIGS. 4 and 5 are, respectively, a chart and a graph for explaining the operation of the embodiment;

FIGS. 8 and 9 are a chart and a graph, respectively, for explaining an operation of the embodiment shown in FIG. 7.

DETAILED DESCRIPTION OF THE PREFERRED EMBODIMENTS

Embodiments of the present invention will now be described below, with reference to the accompanying drawings.

Figure 1:
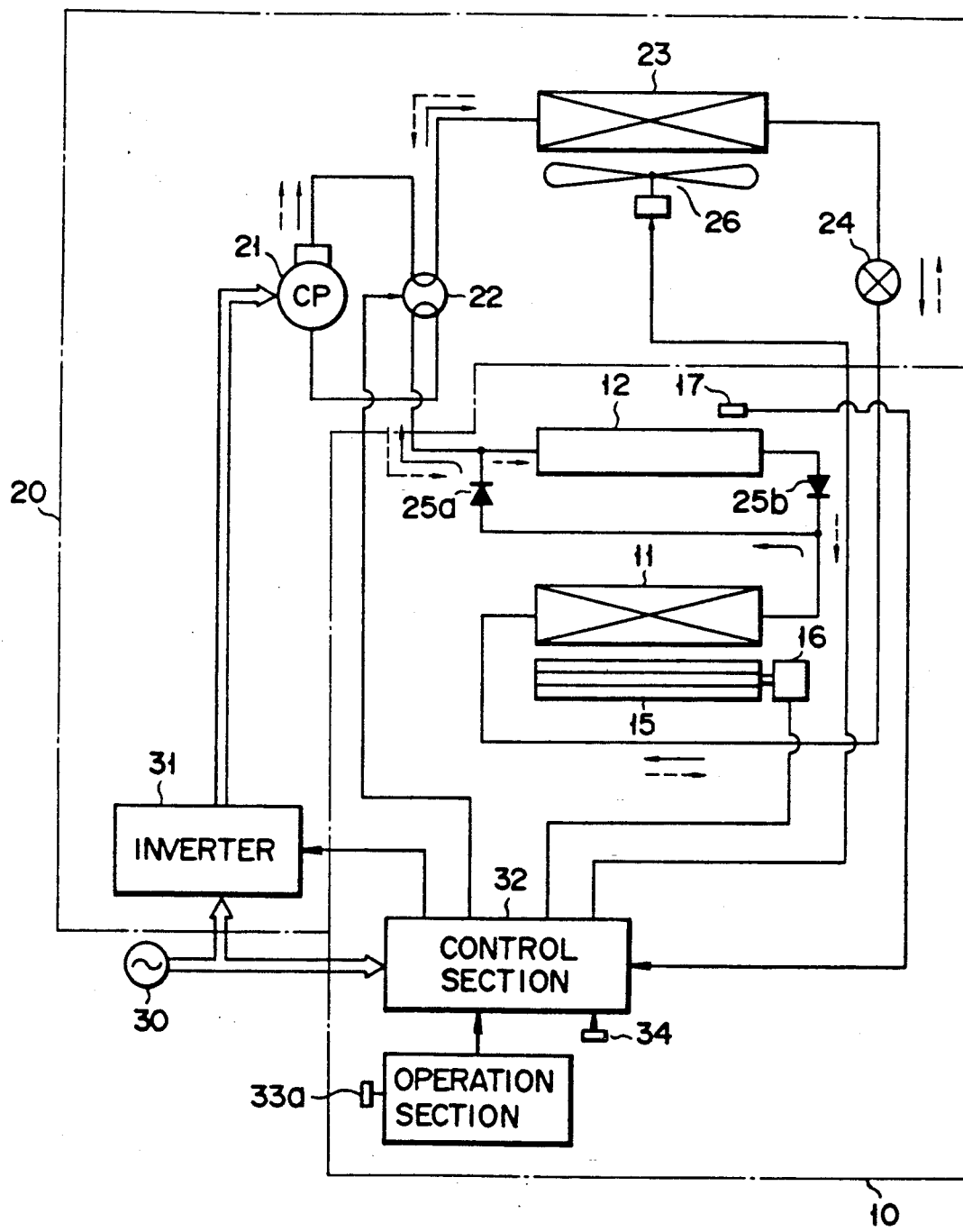
FIG. 1 is a block diagram showing an arrangement of a refrigeration cycle and a control circuit section according to an embodiment of the present invention.

In a first embodiment, as shown in FIG. 1, a heat pump type refrigeration cycle and its control circuit are formed between indoor unit 10 and outdoor unit 20.

Reference numeral 21 denotes a variable-capacity compressor which is housed in outdoor unit 20. Compressor 21 communicates with 4-way valve 22, outdoor heat exchanger 23, a decompressor, e.g., an expansion valve 24, and with indoor heat exchanger 11, check valves 25a and 25b, and radiant heat exchanger (radiant panel) 12 also housed in indoor unit 10, thereby constituting a heat pump type refrigeration cycle.

Figure 2:
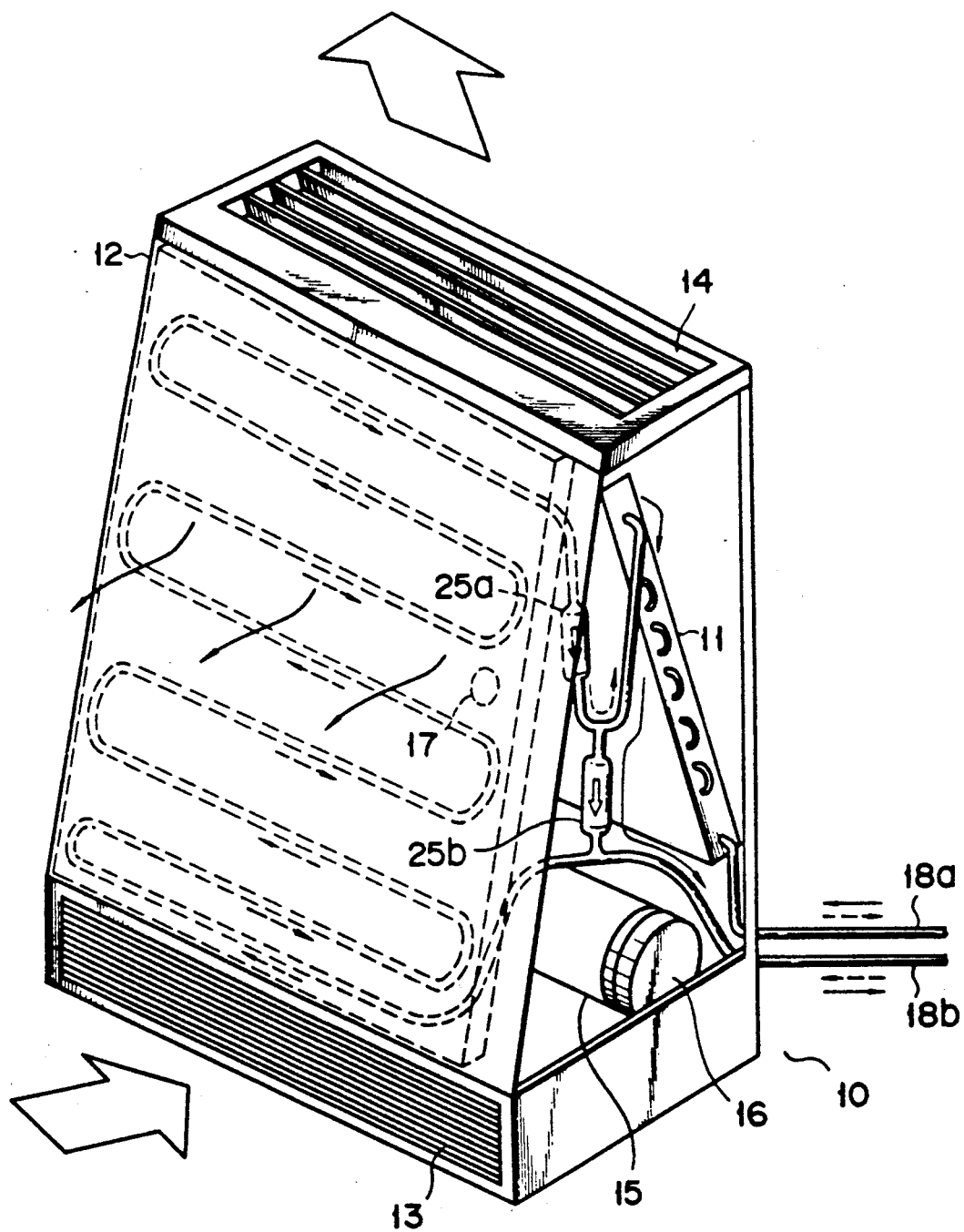
FIG. 2 is a perspective view showing a detailed structure of an indoor unit used in the embodiment.

FIG. 2 shows indoor unit 10 with its side cover detached. Indoor unit 10 includes indoor heat exchanger 11 mounted upright in the rear portion of indoor unit 10, and radiant heat exchanger (to hereinafter be referred to as a radiant panel) 12 having a heat radiation area of, for example, about 1 m² and mounted upright in the front portion of indoor unit 10 so as to oppose indoor heat exchanger 11.

As is shown in FIG. 2, indoor 10 has air intake port 13 formed in its lower portion and air delivery port 14 formed in its upper portion. An air duct is formed from air intake port 13 to air delivery port 14 so as to extend along radiant panel 12 and pass through indoor heat exchanger 11. Indoor-fan 15 and variable-speed fan motor 16 are arranged in the air duct, near air intake port 13.

In addition, radiant panel 12 has a radiant panel temperature sensor (thermistor) 17 attached thereto.

In FIG. 2, reference numerals 18a and 18b respectively denote pipings to be connected to outdoor unit 20. In FIG. 1, reference numerals 25a and 25b respectively denote check valves interposed between the pipings in indoor unit 10 and having flow directions indicated by arrows.

During a cooling operation, a refrigerant is supplied in the directions indicated by the solid arrows in FIG. 1 and 2 so as to form a cooling cycle. In this case, outdoor and indoor heat exchangers 23 and 11 serve as a condenser and an evaporator, respectively. During a heating operation, the refrigerant is supplied in the directions indicated by the broken arrows, upon the switching of 4-way valve 22, so as to form a heating cycle. In this case, radiant panel 12 and indoor heat exchanger 11 both serve as condensers, and outdoor heat exchanger 23 serves as an evaporator.

An outdoor-fan 26 is arranged near outdoor heat exchanger 23, and supplies air thereto.

Reference numeral 30 in FIG. 1, denotes a commercial AC power source, to which inverter 31 and control section 32 are connected. Inverter 31 rectifies an AC power source voltage, converts it into an AC voltage having a frequency corresponding to a command from control section 32, and applies it to a driving motor of compressor 21. Control section 32, comprising a CPU and its peripheral circuits, such as a counter and a memory, both connected to the CPU, controls the overall air conditioner. Also connected to control section 32 are variable-speed fan motor 16, radiant panel temperature sensor 17, 4-way valve 22, the motor for driving outdoor-fan 26, inverter 31, operation section 33 including indoor temperature setting member 33a, and indoor temperature sensor 34.

Figure 3:
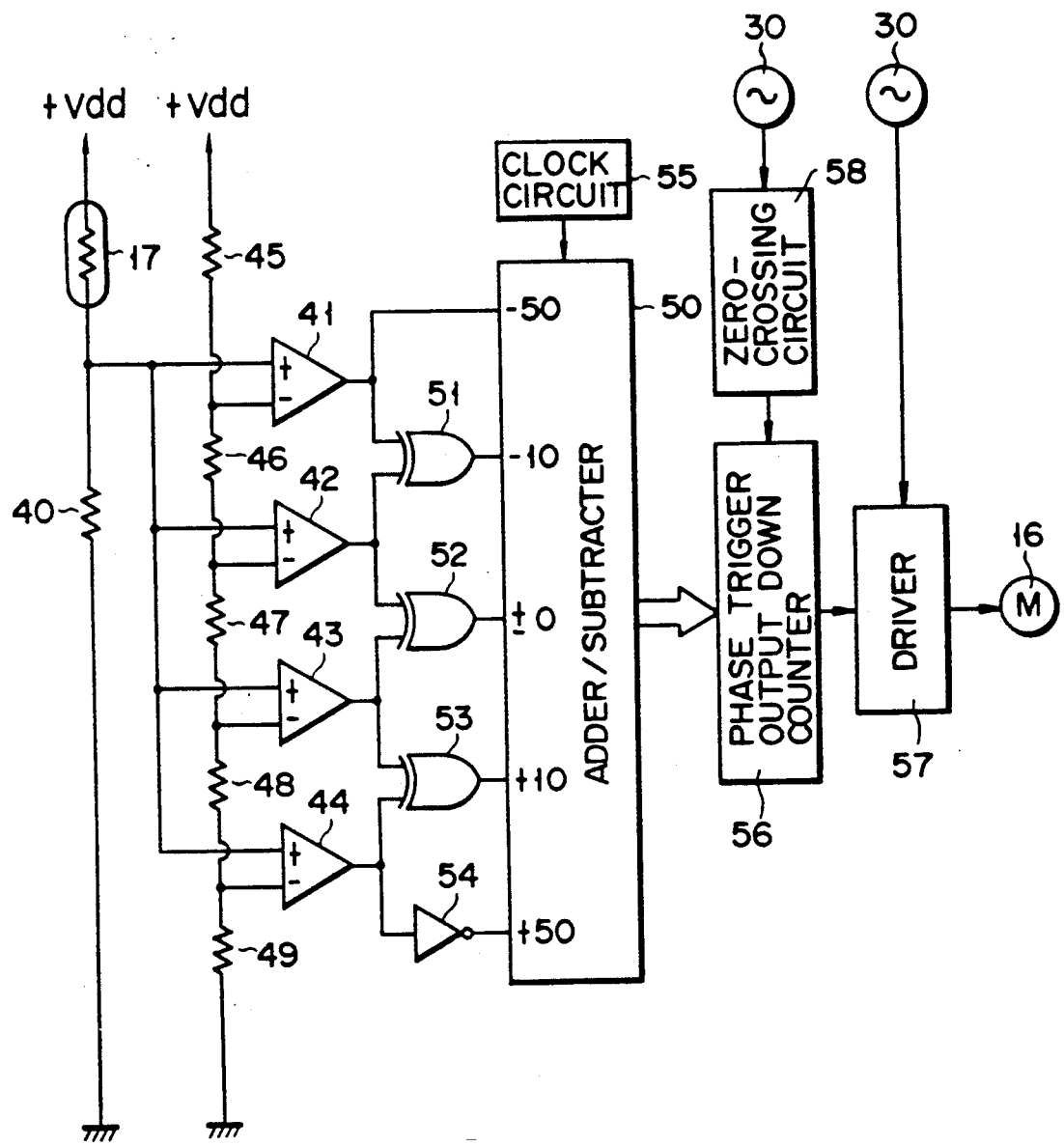
FIG. 3 is a block diagram showing an arrangement of a main part of a control section included in the embodiment.

FIG. 3 shows a main part of control section 32.

Referring to FIG. 3, DC voltage Vdd is applied to a series circuit made up of radiant panel temperature sensor 17 and resistor 40, a voltage between both edges of resistor 40 being applied to the non-inverting input terminals (+) of comparators 41, 42, 43, and 44.

DC voltage Vdd is also applied to a series circuit made up of resistors 45, 46, 47, 48, and 49, and voltages appearing at the nodes of these resistors are applied as reference voltages to the inverting input terminals (-) of comparators 41, 42, 43, and 44, respectively.

An output from comparator 41 is supplied to the "−50" terminal of adder/subtracter 50 (e.g., TC74HC-161 TOSHIBA, and periphery circuit), as a kind of counter, and to one input terminal of EXOR gate 51; that from comparator 42 is supplied to the other input terminal of EXOR gate 51 and to one input terminal of EXOR gate 52; that from comparator 43 is supplied to the other input terminal of EXOR gate 52 and to one input terminal of EXOR gate 53; and that from comparator 44 is supplied to the other input terminal of EXOR gate 53 and to the "+50" terminal of adder/subtracter 50 via inverter 54.

An output from EXOR gate 51 is supplied to the "−10" terminal of adder/subtracter 50; that from EXOR gate 52 is supplied to the "±0" terminal of adder/subtracter 50; and that from EXOR gate 53 is supplied to the "+10" terminal of adder/subtracter 50. Adder/subtracter 50 will now be described in detail below.

When an input to the "+50" terminal is set at H level (logic "1"), adder/subtracter 50 generates time data increased by 50 μsec every predetermined time interval, based on a clock signal from clock circuit 55. More specifically, adder/subtracter 50 first generates time data of +50 μsec, and subsequently generates time data of +100 μsec, +150 μsec, and so forth.

When an input to the "+10" terminal is set at H level, adder/subtracter 50 generates time data increased by 10 μsec every predetermined time interval. More specifically, adder/subtracter 50 generates time data of +10 μsec first, and subsequently generates time data of +20 μsec, +30 μsec, . . . .

It should be noted that when an input to the "±0" terminal is set at H level, adder/subtracter 50 generates no time data.

When an input to the "−10" terminal is set at H level, adder/subtracter 50 generates time data decreased by 10 μsec every predetermined time interval. More specifically, adder/subtracter 50 generates time data of −10 μsec first, and subsequently generates time data of −20 μsec, −30 μsec, . . . .

When an input to the "−50" terminal is set at H level, adder/subtracter 50 generates time data decreased by 50 μsec every predetermined time interval. More specifically, adder/subtracter 50 generates time data of −50 μsec first, and subsequently generates time data of −100 μsec, −150 μsec, . . . .

Time data output from adder/subtracter 50 are supplied in the above manner to phase trigger output down-counter 56, counter 56 setting time data supplied from adder/subtracter 50 every time zero-crossing circuit 58 detects the zero-crossing point of an AC power source voltage. If any count value is left (not zero) when this setting is performed, time data is added to the count value. Decrement of a count is started simultaneously with setting. When the count value becomes zero, a trigger signal is generated.

In the initial operating of the air conditioner, predetermined time data is set to counter 56, and time data from adder/subtracter 50 is added thereto. It should be noted that this predetermined time data corresponds to a time period longer than the half period of an AC power source voltage.

The trigger signal output from counter 56 is supplied to driver 57 as a phase trigger output.

Driver 57 controls a variable phase angle of an AC power source voltage at a timing corresponding to an input trigger signal, and generates a driving voltage for variable-speed fan motor 16.

A heating operation with heat radiation in the above-described arrangement will be described below with reference to FIGS. 4 and 5.

A heating operation mode is set by operation section 33, and a desired indoor temperature is set by indoor temperature setting member 33a. The operation of the air conditioner is then started by operation section 33.

Subsequently, control section 32 drives inverter 31, and starts compressor 21. In addition, control section 32 starts outdoor-fan 26, and performs a switching operation of 4-way valve 22. With this operation, a heating cycle is formed, and both radiant panel 12 and indoor heat exchanger 11 serve as condensers, thereby starting the heating operation.

During this heating operation, control section 32 controls the operating frequency (the output frequency of inverter 31) of compressor 21 in accordance with a difference between the detection temperature of indoor temperature sensor 34 and the indoor temperature preset by indoor temperature setting member 33a.

The temperature of radiant panel 12 is low during an initial operation, and hence the detection temperature of radiant panel temperature sensor 17 falls within range A which is far below preset temperature Ths.

At this time, the resistance of radiant panel temperature sensor 17 is high, and a voltage generated at resistor 40 is low, so that outputs from all comparators 41, 42, 43, and 44 are set at L level (logic "0"), and an output from inverter 54 is set at H level. As a result, an input to the "+50" terminal of adder/subtracter 50 is set at H level.

As described above, when the input to the "+50" terminal of adder/subtracter 50 is set at H level, time data of +50 μsec is supplied to counter 56. The supplied time data is added to the preset time data which has been set in counter 56 as an initial value. Even when decrement of counter 56 is started, its count value does not immediately become zero.

Consequently, no trigger signal is generated from counter 56, and the phase angle of an AC power source voltage at driver 57 becomes a maximum value. Therefore, a driving voltage for variable-speed fan motor 16 is not obtained, and variable-speed fan motor is kept stopped.

Since variable-speed fan motor 16 is stopped and fan 15 is not rotated, no air is delivered to radiant panel 12, and hence the temperature of radiant panel 12 is quickly increased.

When the detection temperature of radiant panel temperature sensor 17 reaches range B exceeding preset temperature Th4, an output from comparator 44 is set at H level. Then, an output from EXCR gate 53 is set at H level, and an input to the "+10" terminal of adder/subtracter 50 is set at H level.

When the input to the "+10" terminal of adder/subtracter 50 is set at H level, time data of +10 μsec is supplied to counter 56. Since the set value of counter 56 is increased in the same manner as described above, even when decrement of counter 56 is started, its count value does not immediately become zero.

Consequently, no trigger signal is generated from counter 56, and the phase angle of an AC power source voltage at driver 57 becomes a maximum value, thereby keeping variable-speed fan motor 16 in an inoperative state.

When the temperature of radiant panel 12 is further increased, and the detection temperature of radiant panel temperature sensor 17 exceeds preset temperature Th3 and enters range C which is a predetermined range having preset temperature Ths as the central value, outputs from comparators 43 and 44 are set at H level. Then, an output from EXOR gate 52 is set at H level, and hence an input to the "±0" terminal of adder/subtracter 50 is set at H level.

As described above, when the input to the "±0" terminal of adder/subtracter 50 is set at H level, time data is not generated. Therefore, the set value of counter 56 is not increased. In this case, since a large count value is left in counter 56, even when decrement of counter 56 is started, the count value does not immediately become zero.

Since no trigger signal is generated from counter 56, the phase angle of an AC power source voltage at driver 57 becomes a maximum value, and variable-speed fan motor 16 is kept stopped.

With this operation, when the temperature of radiant panel 12 is further increased and the detection temperature of radiant panel temperature sensor 17 enters range D exceeding preset temperature Th2, outputs from comparators 42, 43, and 44 are set at H level. As a result, an output from EXOR gate 51 is set at H level, and hence an input to the "−10" terminal of adder/subtracter 50 is set at H level.

When the input to the "−10" terminal of adder/subtracter 50 becomes H level, time data of −10 μsec is generated. Since adder/subtracter 50 sequentially generates time data of −10 μsec, −20 μsec, −30 μsec, ... in the same manner as described above, the set value of counter 56 is gradually decreased. Therefore, in such a state, the count value of counter 56 is set to be zero at a relatively early timing, and a trigger signal is generated at each timing.

In this state, as the generation timing of trigger signals is gradually increased, the phase angle of an AC power source voltage at driver 57 is decreased. In this manner, starting power for variable-speed fan motor 16 is obtained. Subsequently, variable-speed motor fan 16 is started, and its speed is gradually increased, thereby rotating indoor fan 15.

When rotation of indoor-fan 15 is started, indoor air is supplied from air intake port 13 into indoor unit 10 and is delivered to radiant panel 12. At the same time, the air is heated by indoor heat exchanger 11, and is blown into the room through air delivery port 14 as warm air.

If the amount of air blown from indoor-fan 15 is small at this time, the temperature of radiant panel 12 is further increased, and the detection temperature of radiant panel temperature sensor 17 reaches range E exceeding preset temperature Th1. As a result, outputs from all comparators 41, 42, 43, and 44 are set at H level, and an output from EXOR gate 51 is set at H level. That is, an input to the "+50" terminal of adder/subtracter 50 is set at H level.

When the input to the "+50" terminal is set at H level as described above, adder/subtracter 50 sequentially generates time data of −50 μsec, −100 μsec, −150 μsec, ... in the above-described manner. As a result, the generation timing of trigger signals from counter 56 is increased. Subsequently, the phase angle of an AC power source voltage at driver 57 is decreased, and driving power for variable-speed fan motor 16 is increased, thereby quickly increasing the speed of variable-speed fan motor 16.

When the amount of air blown from indoor-fan 15 is increased in this manner, the detection temperature of radiant panel temperature sensor 17 is gradually decreased and shifts from range E to range D. Upon this shift, the amount of blown air is decreased, and the detection temperature is stabilized in range C. That is, the temperature of radiant panel 12 can be kept at preset temperature Ths (e.g., about 45° C.).

When the temperature of radiant panel 12 is decreased due to a decrease in outdoor temperature or the like, and the detection temperature of radiant panel temperature sensor 17 is decreased to range B, an input to the "+10" terminal of adder/subtracter 50 is set at H level. As a result, the generation timing of trigger signals is slowed down, and the phase angle of an AC power source voltage at driver 57 is gradually increased, thereby decreasing the speed of variable-speed fan motor 16. With this operation, the detection temperature falls within range C and is stabilized therein.

In this manner, phase angle control is performed in accordance with a difference between the temperature of radiant panel 12 and preset temperature Ths so as to adjust the speed of variable-speed fan motor 16, i.e., the amount of air blown from indoor-fan 15. Therefore, the temperature of radiant panel 12 can be kept at a predetermined value regardless of changes in outdoor temperature and the like. Since stability of a heating operation using free convection is increased in this manner, comfort of the user can be greatly increased.

In addition, the above-described speed adjustment of indoor-fan 15 by phase control can be performed at low cost compared with a system using an inverter, and hence no economical problem is posed.

Figure 6:
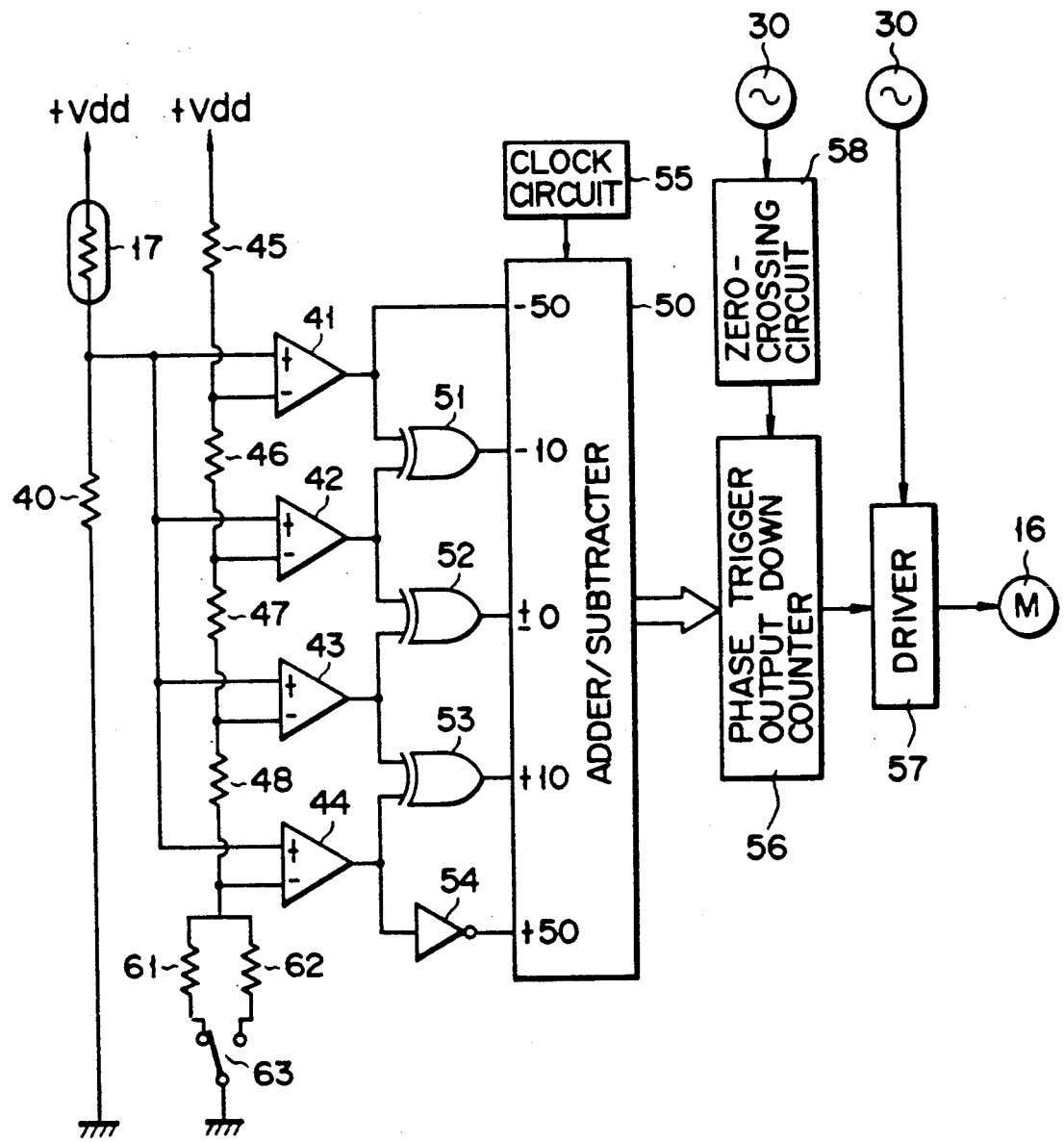
FIG. 6 is a block diagram showing an arrangement of a main part of a control section according to another embodiment of the present invention.

In the above embodiment, preset temperature Ths is fixed. However, resistor 49 for obtaining a reference voltage in FIG. 3 may be replaced with resistors 61 and 62 as shown in a second embodiment in FIG. 6 so that one of the resistors is selected by switch 63 so as to switch preset temperature Ths in two stages. In this case, an operation knob of switch 63 is attached to operation section 33 so that the user can perform a switching operation.

With this arrangement, the user can arbitrarily select the temperature of heat radiation, and hence comfort of the user can be further increased.

In the above embodiment, only the phase angle with respect to an AC power source voltage is controlled in accordance with a difference between the temperature of radiant panel 12 and preset temperature Ths. However, if an air-conditioning load greatly varies, operating frequency control of compressor 21 must be added. More specifically, compressor 21 is driven at a predetermined operating frequency in an initial operation. If the temperature of radiant panel 12 is excessively high, the operating frequency of compressor 21 is decreased. If the temperature of radiant panel 12 is excessively low, the operating frequency of compressor 12 is increased.

Figure 7:
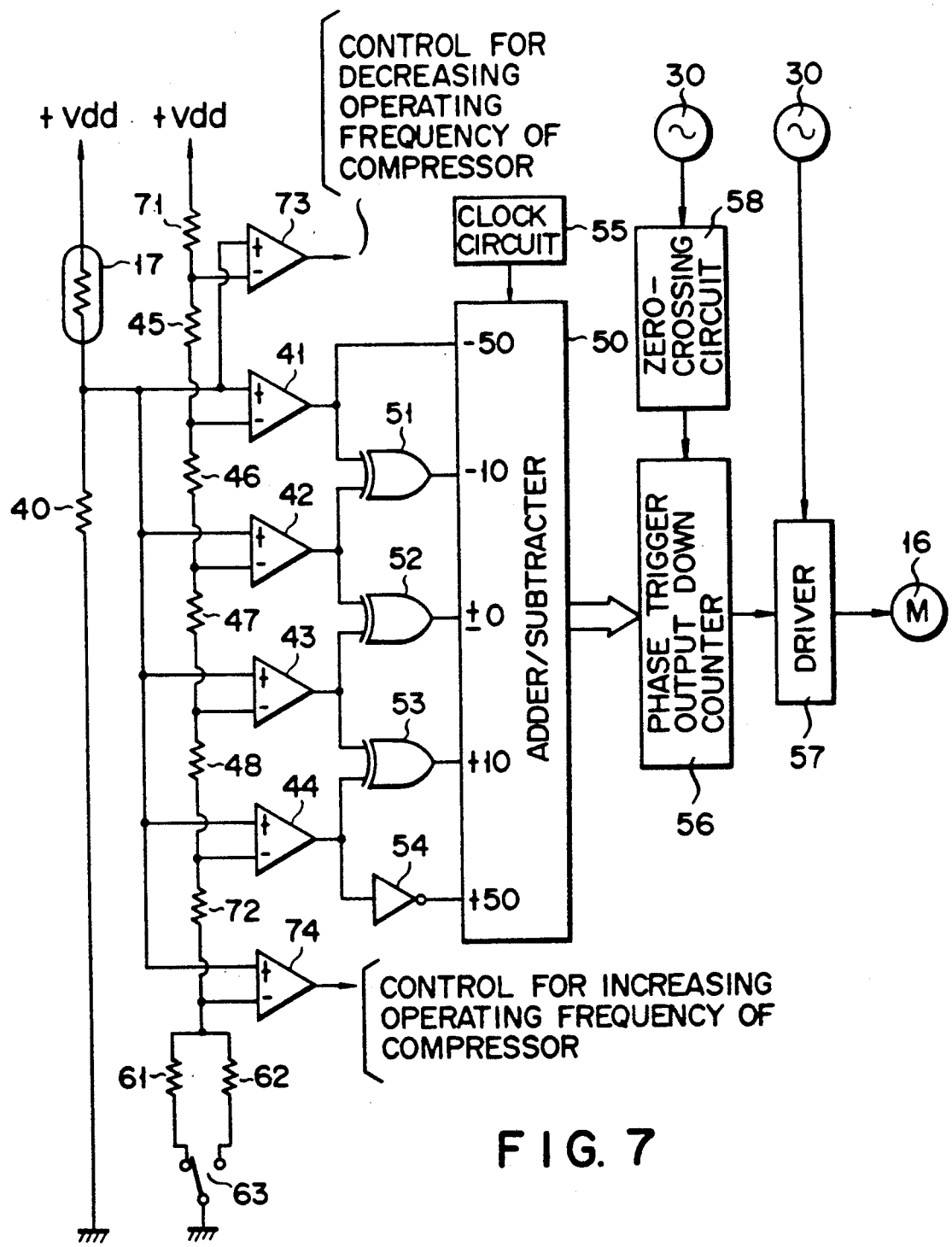
FIG. 7 is a block diagram showing an arrangement of a main part of a control section according to still another embodiment of the present invention.

In this case, as shown in a third embodiment in FIG. 7, resistor 71 for obtaining a reference voltage for a high-temperature range, and resistor 72 for obtaining a reference voltage for a low-temperature range are arranged. Furthermore, comparators 73 and 74 respectively used for the high- and low-temperature ranges are arranged.

Figure 9:
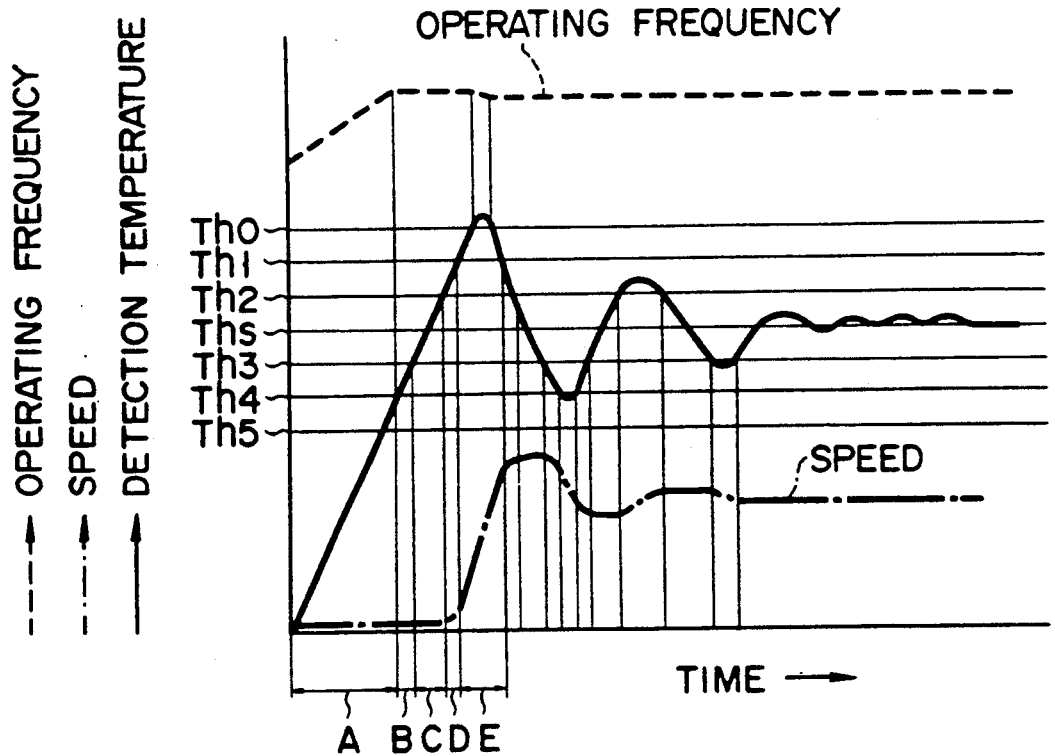
Figure 10:
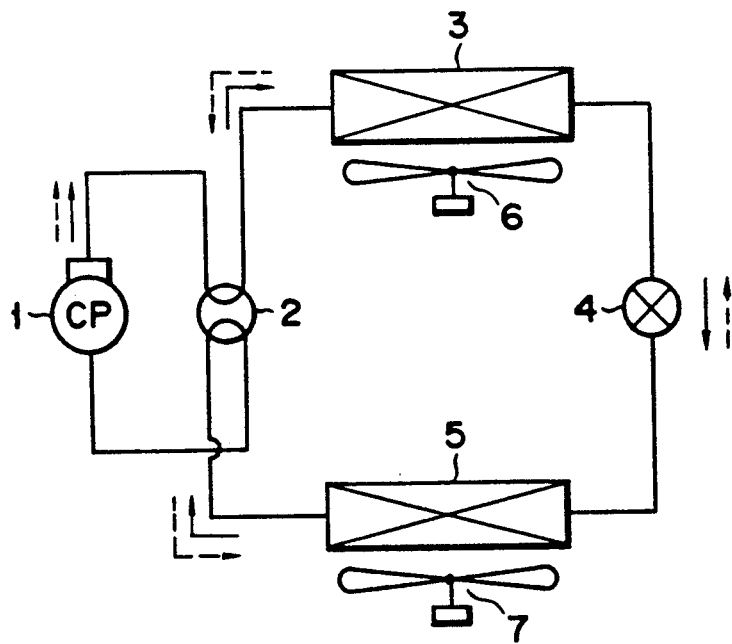
FIG. 10 is a block diagram showing an arrangement of a conventional heat pump type refrigeration cycle.

In this case, as shown in FIGS. 8 and 9, when the detection temperature of radiant panel temperature sensor 17 exceeds temperature Th0 which is much higher than preset temperature Ths, an output from comparator 73 is set at H level. In this case, control section 32 decreases the operating frequency of compressor 21 so as to decrease its heating capacity, thereby decreasing the temperature of radiant panel 12. The operating frequency is decreased by a predetermined value every predetermined time interval.

If the detection temperature of radiant panel temperature sensor 17 is decreased below Th5 which is much lower than preset temperature Ths, an output from comparator 74 is set at H level. In this case, control section 32 increases the operating frequency of compressor 21 so as to increase its heating capacity, thereby increasing the temperature of radiant panel 12. The operating. frequency is increased by a predetermined value every predetermined time interval.

With this operation, reliability of temperature control can be increased, and comfort of the user can be greatly increased.

As has been described above, according to the present invention, the air conditioner comprises a heat pump type refrigeration cycle in which a compressor, a 4-way valve, an outdoor heat exchanger, a decompressor, an indoor heat exchanger, and a radiant heat exchanger (radiant panel) communicate with each other, an indoor-fan for supplying air in the indoor heat exchanger so as to control the temperature of the radiant heat exchanger (radiant panel), a variable-speed fan motor for driving the indoor-fan, a radiant panel temperature sensor for detecting the temperature of the radiant heat exchanger, and a means for controlling an AC power source voltage used for driving of the variable-speed fan motor in accordance with a difference (e.g., a phase angle) between a detection temperature of the radiant panel temperature sensor and a preset temperature. With this arrangement, the temperature of heat radiation can be kept constant, and stability of a heating operation with radiant heat can be increased. Therefore, an air conditioner capable of greatly increasing comfort of the user can be realized.

That is, according to the present invention, the temperature of the radiant heat exchanger is detected so that the speed of the variable-speed motor can be changed in accordance with a difference between the detection temperature and a preset temperature. The amount of air blown from the fan is changed in accordance with this change in speed so that the radiant heat exchanger can be kept at a preset temperature through the indoor heat exchanger.

What is claimed is:

1. An air-conditioner, comprising: a refrigeration cycle including:

a compressor for compressing a refrigerant, an outdoor heat exchanger including means to operate as an evaporator, said compressor and said outdoor heat exchanger being arranged outside a room to be air-conditioned, an indoor heat exchanger including means for exchanging, primarily by convection of air, heat from the refrigerant to the air in the room to be air-conditioned, and a radiant heat exchanger including means for primarily radiating heat into the room to be air-conditioned, said indoor heat exchanger and said radiant heat exchanger being arranged inside the room to be air-conditioned and including means to operate as condensers;

said refrigeration cycle including means, operable in a heating mode, to interconnect said compressor, said outdoor heat exchanger and said indoor and radiant heat exchangers to allow circulation of refrigerant therebetween;

fan means for supplying air to at least said indoor heat exchanger, said fan means having a variable-speed motor for driving said fan means with a variable speed;

detecting means for detecting the temperature of said radiant heat exchanger; and control means for controlling the speed of said variable-speed motor of said fan means, so as to control the temperature of said radiant heat exchanger in accordance with a temperature detection signal from said detecting means, said control means including means for controlling temperature in different manners in accordance with levels of the temperature detecting signal; said control means including:
a positive voltage source;
sensing circuit means, connected to said detecting means and said positive voltage source, for sensing a temperature of a radiant panel of said radiant heat exchanger;
a series circuit of resistors connected to said positive voltage source;
a plurality of comparators having one input from said sensing circuit and one input from said series circuit;
a plurality of logic gates having inputs being outputs of said plurality of comparators;
an adder/subtracter circuit having inputs being outputs of said plurality of logic gates;
a phase trigger output down counter connected to said adder/subtracter circuit; and
a driver circuit for driving said fan connected to said phase trigger output down counter.

2. An air-conditioner according to claim 1, wherein said indoor heat exchanger is connected so as to oppose said radiant heat exchanger, which is buried in a radiant panel and mounted upright.

3. An air conditioner according to claim 1, wherein said series circuit includes first and second resistor networks in parallel with a switch for selecting between said first and second networks.

4. An air conditioner according to claim 3, wherein one of said plurality of comparators supplies a control signal for increasing the operating frequency of the compressor.

5. An air conditioner according to claim 1, wherein said radiant heat exchanger is buried in a radiant panel which is mounted upright so as to oppose said indoor heat exchanger.

6. An air conditioner according to claim 1, wherein said control means includes means for comparing a temperature detection signal from said detecting means with a desired preset temperature value, and means for switching the preset temperature value.

7. An air-conditioner, comprising:
a heat pump type refrigeration cycle including:
  a compressor for compressing a refrigerant,
  an outdoor heat exchanger including means to operate as an evaporator, said compressor and said outdoor heat exchanger being arranged outside a room to be air-conditioned,
  an indoor heat exchanger including means for exchanging, primarily by convection of air, heat from the refrigerant to of air in the room to be air-conditioned, and
  a radiant heat exchanger including means for primarily radiating heat into the room to be air-conditioned, said indoor heat exchanger and said radiant heat exchanger being arranged inside the room to be air-conditioned and including means to operate as condensers;
a fan for supplying air to at least said indoor heat exchanger so as to control the temperature of said radiant heat exchanger;
a variable-speed motor for driving said fan;
a temperature sensor for detecting the temperature of said radiant heat exchanger; and
control means for controlling the phase angle of an AC power source voltage used for driving of said variable-speed motor, in accordance with the difference between a detection temperature of said temperature sensor and a preset temperature, said control means including means for performing phase control of the AC power source voltage and applying the resultant voltage to said fan and means for performing temperature controlling in a plurality of ranges corresponding to levels indicated by temperature detection signals from said temperature sensor, said control means including:
a positive voltage source;
sensing circuit means, connected to said detecting means and said positive voltage source, for sensing a temperature of a radiant panel of said radiant heat exchanger;
a series circuit of resistors connected to said positive voltage source;
a plurality of comparators having one input from said sensing circuit and one input from said series circuit;
a plurality of logic gates having inputs being outputs of said plurality of comparators;
an adder/subtracter circuit having inputs being outputs of said plurality of logic gates;
a phase trigger output down counter connected to said adder/subtracter circuit; and
a driver circuit for driving said fan connected to said phase trigger output down counter.

8. An air-conditioner according to claim 7, wherein said indoor heat exchanger is connected so as to oppose said radiant heat exchanger, which is buried in a radiant panel and mounted upright.

9. An air conditioner according to claim 7, wherein said control means includes means for comparing a temperature detection signal from said temperature sensor with a desired preset temperature value, and means for switching the preset temperature value.

10. An air conditioner according to claim 7, wherein said series circuit includes first and second resistor networks in parallel with a switch for selecting between said first and second networks.

11. An air conditioner according to claim 10, wherein one of said plurality of comparators supplies a control signal for increasing the operating frequency of the compressor.

12. An air-conditioner comprising:
a refrigeration cycle including:
  a compressor for compressing a refrigerant,
  an outdoor heat exchanger including means to operate as an evaporator, said compressor and said outdoor heat exchanger being arranged outside a room to be air-conditioned,
  an indoor heat exchanger including means for exchanging, primarily by convection of air, heat from the refrigerant to the air in the room to be air-conditioned, and
  a radiant heat exchanger including means for primarily radiating heat into the room to be air-conditioned, said indoor heat exchanger and said radiant heat exchanger being arranged inside the room to be air-conditioned and serving as condensers;
said refrigeration cycle including means, operable in a heating mode, to interconnect said compressor, said outdoor heat exchanger and said indoor and radiant heat exchangers to allow circulation of refrigerant therebetween;

fan means for supplying air to at least said indoor heat exchanger, said fan means having a variable-speed motor for driving said fan means with a variable speed;

detecting means for detecting the temperature of said radiant heat exchanger; and control means for controlling the speed of said variable-speed motor of said fan means, so as to control the temperature of said radiant heat exchanger in accordance with a temperature detection signal from said detecting means, said control means including means for executing temperature control in different manners in accordance with levels of the temperature detecting signal, comparing means for comparing a temperature detection signal from said detecting means with a desired preset temperature value, and means for changing the capacity of said compressor when a comparison result from said comparing means exceeds a predetermined value, said control means comprising:

a positive voltage source;

sensing circuit means, connected to said detecting means and said positive voltage source, for sensing a temperature of a radiant panel of said radiant heat exchanger;

a series circuit of resistors connected to said positive voltage source;

a plurality of comparators having one input from said sensing circuit and one input from said series circuit;

a plurality of logic gates having inputs being outputs of said plurality of comparators;

an adder/subtracter circuit having inputs being outputs of said plurality of logic gates;

a phase trigger output down counter connected to said adder/subtracter circuit; and a driver circuit for driving said fan connected to said phase trigger output down counter.

13. An air conditioner according to claim 12, wherein said radiant heat exchanger is buried in a radiant panel which is mounted upright so as to oppose said indoor heat exchanger.

14. An air conditioner according to claim 12, wherein said series circuit includes first and second resistor networks in parallel with a switch for selecting between said first and second networks.

15. An air conditioner according to claim 14, wherein one of said plurality of comparators supplies a control signal for increasing the operating frequency of the compressor.

16. An air-conditioner comprising:

a heat pump type refrigeration cycle including:

a compressor for compressing a refrigerant, an outdoor heat exchanger including means to operate as an evaporator, said compressor and said outdoor heat exchanger being arranged outside a room to be air-conditioned, an indoor heat exchanger including means for exchanging, primarily by convection of air, heat from the refrigerant to the air in the room to be air-conditioned, and a radiant heat exchanger including means for primarily radiating heat into the room to be air-conditioned, said indoor heat exchanger and said radiant heat exchanger being arranged inside the room to be air-conditioned and including means to operate as condensers;

a fan for supplying air to at least said indoor heat exchanger so as to control the temperature of said radiant heat exchanger;

a variable-speed motor for driving said fan;

a temperature sensor for detecting the temperature of said radiant heat exchanger; and control means for controlling the phase angle of an AC power source voltage used for driving of said variable-speed motor, in accordance with the difference between a detection temperature of said temperature sensor and a preset temperature, said control means including means for performing phase control of the AC power source voltage and applying the resultant voltage to said fan, means for performing temperature controlling in a plurality of ranges corresponding to levels indicated by temperature detection signals from said temperature sensor, comparing means for comparing a temperature detecting signal from said temperature sensor with a desired preset temperature value, and means for changing a capacity of said compressor when a comparison result from said comparing means exceeds a predetermined value, said control means comprising:

a positive voltage source;

sensing circuit means, connected to said detecting means and said positive voltage source, for sensing a temperature of a radiant panel of said radiant heat exchanger;

a series circuit of resistors connected to said positive voltage source;

a plurality of comparators having one input from said sensing circuit and one input from said series circuit;

a plurality of logic gates having inputs being outputs of said plurality of comparators;

an adder/subtracter circuit having inputs being outputs of said plurality of logic gates;

a phase trigger output down counter connected to said adder/subtracter circuit; and a driver circuit for driving said fan connected to said phase trigger output down counter.

17. An air conditioner according to claim 16, wherein said series circuit includes first and second resistor networks in parallel with a switch for selecting between said first and second networks.

18. An air conditioner according to claim 17, wherein one of said plurality of comparators supplies a control signal for increasing the operating frequency of the compressor.

* * * * *